UNITED STATES PATENT OFFICE.

WILLIAM FIELDS, OF WILMINGTON, DELAWARE.

FERTILIZER.

SPECIFICATION forming part of Letters Patent No. 242,193, dated May 31, 1881.

Application filed December 17, 1880. (No specimens.)

*To all whom it may concern:*

Be it known that I, WILLIAM FIELDS, a citizen of the United States, residing at Wilmington, New Castle county, Delaware, have invented a new and useful composition of matter, being an Improvement in Fertilizers, to be used for agricultural purposes, of which the following is the specification, viz:

My composition consists of the following ingredients, combined in the proportions stated, viz: five hundred pounds of unburned limestone, ground fine; one thousand pounds of unburned feldspar, ground fine; three hundred pounds of unburned oyster-shells, ground fine; two hundred pounds of moldings and scrapings of cast-iron from foundry; nine gallons of pure water; two gallons of sulphuric acid; one pint of nitric acid. These ingredients should be thoroughly mixed together, spread out on a flat surface or floor, and thoroughly dried, either with or without heat, as may be convenient, and when dried to be crushed to the requisite fineness for being sowed either broadcast by hand or in drills.

The question of the length of time required for thoroughly mixing these ingredients is one to be determined by the facilities of the manufacturer, and does not vary the result. Heat in drying is not essential.

What I claim, and desire to secure by Letters Patent of the United States, is—

The herein-described composition of matter to be used as an agricultural fertilizer, consisting of unburned limestone, feldspar, and oyster-shells, ground fine; cast-iron scrapings and moldings from foundry, water, sulphuric acid, and nitric acid, in the above-specified proportions.

WILLIAM FIELDS.

Witnesses:
JOSEPH W. VANDEGRIFT,
JOHN BROOKS.